US008056708B2

United States Patent
Wang et al.

(10) Patent No.: US 8,056,708 B2
(45) Date of Patent: *Nov. 15, 2011

(54) ELASTOMER COMPOSITE MATERIALS IN LOW DENSITY FORMS AND METHODS

(75) Inventors: Ting Wang, Billerica, MA (US); Glendon A. McConnell, Rockford, IL (US); Meng-Jiao Wang, Lexington, MA (US)

(73) Assignee: Cabot Corporation, Boston, MA (US)

( * ) Notice: Subject to any disclaimer, the term of this patent is extended or adjusted under 35 U.S.C. 154(b) by 50 days.

This patent is subject to a terminal disclaimer.

(21) Appl. No.: 12/008,182

(22) Filed: Jan. 9, 2008
(Under 37 CFR 1.47)

(65) Prior Publication Data
US 2008/0113180 A1 May 15, 2008

Related U.S. Application Data

(63) Continuation of application No. 10/039,774, filed on Nov. 9, 2001, now Pat. No. 7,341,142.

(51) Int. Cl.
*B65D 71/00* (2006.01)
*B32B 3/26* (2006.01)
*B32B 19/00* (2006.01)
*B29D 22/00* (2006.01)

(52) U.S. Cl. .......... 206/83.5; 428/304.4; 428/357; 428/34.1; 264/109; 264/115; 264/117; 206/447

(58) Field of Classification Search .......... 428/304.4, 428/34.1; 260/23.7, 42.13; 264/117; 525/1, 525/4, 5, 238, 239
See application file for complete search history.

(56) References Cited

U.S. PATENT DOCUMENTS

| | | |
|---|---|---|
| 1,611,278 A | 12/1926 | Petersen |
| 1,846,820 A | 2/1932 | Darling et al. |
| 2,215,435 A | 9/1940 | Hale |
| 2,769,795 A | 11/1956 | Braendle ............... 260/41.5 |
| 2,964,083 A | 12/1960 | Pfau et al. |
| 2,977,864 A | 4/1961 | Pullar |
| 3,048,559 A | 8/1962 | Heller et al. .............. 260/33 |
| 3,108,982 A | 10/1963 | Barclay ...................... 523/334 |
| 3,294,720 A | 12/1966 | Beber et al. |
| 3,335,200 A | 8/1967 | Thorn ........................ 523/333 |
| 3,403,121 A | 9/1968 | Hare ........................ 260/33.6 |
| 3,494,740 A | 2/1970 | Speck ........................ 23/209.4 |
| 3,526,688 A | 9/1970 | Shelton et al. |
| 3,720,742 A | 3/1973 | Shelton et al. |
| 3,767,605 A | 10/1973 | Gerlicher ................... 260/23.7 |
| 3,775,933 A | 12/1973 | Prescott et al. |
| 3,887,532 A | 6/1975 | Neubert ...................... 260/85.1 |
| 4,025,711 A | 5/1977 | Davidson et al. ............. 528/488 |
| 4,029,633 A | 6/1977 | Hagopian et al. .......... 260/42.55 |
| 4,057,141 A | 11/1977 | Laurie et al. |
| 4,064,093 A | 12/1977 | Dalton et al. ............... 260/29.7 |
| 4,103,074 A | 7/1978 | Hertel et al. ................ 528/487 |
| 4,112,158 A | 9/1978 | Creekmore et al. |
| 4,124,550 A | 11/1978 | Kobayashi et al. ........ 260/23.3 |
| 4,207,218 A * | 6/1980 | Jorgensen et al. .......... 524/399 |
| 4,213,957 A | 7/1980 | Hunt et al. ................. 423/450 |
| 4,248,348 A | 2/1981 | Butler et al. |
| 4,265,939 A | 5/1981 | Tebbens et al. ............. 427/222 |
| 4,280,575 A * | 7/1981 | di Rosa ........................ 177/123 |
| 4,299,952 A | 11/1981 | Pingel et al. ................ 528/500 |
| 4,302,377 A | 11/1981 | Gurak et al. ................ 528/487 |
| 4,303,569 A | 12/1981 | Güurak et al. ............... 260/29.7 |
| 4,375,497 A | 3/1983 | Sandstrom .................. 428/407 |
| 4,446,309 A | 5/1984 | Jiroumaru et al. .......... 528/486 |
| 4,456,381 A | 6/1984 | Inoue et al. ................... 366/97 |
| 4,537,928 A | 8/1985 | Johnson et al. |
| 4,542,992 A | 9/1985 | Markhart ..................... 366/300 |
| 4,552,725 A | 11/1985 | Audeh ......................... 422/140 |
| 4,643,890 A | 2/1987 | Schramm .................... 423/659 |
| 4,718,771 A | 1/1988 | Asai et al. ..................... 366/97 |
| 4,744,744 A | 5/1988 | Sugimori et al. ............ 425/464 |
| 4,914,186 A | 4/1990 | Miss et al. .................. 528/500 |
| 4,917,211 A | 4/1990 | Yamada et al. .............. 181/0.5 |
| 4,917,501 A | 4/1990 | Simonet ....................... 366/99 |
| 5,009,849 A | 4/1991 | Ebner et al. ................... 422/83 |
| 5,047,287 A | 9/1991 | Horiuchi et al. ............. 428/248 |
| 5,098,635 A | 3/1992 | Widmer |
| 5,119,227 A | 6/1992 | Dawson et al. ............. 359/244 |
| 5,119,927 A | 6/1992 | Bruggemann ............... 198/847 |
| 5,205,972 A | 4/1993 | Kafka .......................... 264/101 |
| 5,227,425 A | 7/1993 | Rauline ....................... 524/493 |
| 5,264,290 A | 11/1993 | Touchet et al. .............. 428/492 |
| 5,282,691 A | 2/1994 | McIntosh et al. |
| 5,316,708 A | 5/1994 | Drews |
| 5,328,949 A | 7/1994 | Sandstrom et al. .......... 524/262 |

(Continued)

FOREIGN PATENT DOCUMENTS

CH 581493 11/1976

(Continued)

OTHER PUBLICATIONS

Written Opinion for PCT US02/35805, dated Jun. 3, 2005.

(Continued)

*Primary Examiner* — Jennifer Chriss
*Assistant Examiner* — Altrev Sykes

(57) ABSTRACT

A bale of elastomer composite is formed of elastomer and filler, the bale having a void volume of at least 3%. In another aspect, a container is provided, at least a portion of the container being occupied by elastomer composite pieces of elastomer and filler, wherein the occupied portion of the container has a void volume of at least 3%.

8 Claims, No Drawings

U.S. PATENT DOCUMENTS

| | | | |
|---|---|---|---|
| 5,430,088 A | 7/1995 | Ohashi et al. | 524/496 |
| 5,472,928 A | 12/1995 | Scheuerman et al. | 502/305 |
| 5,516,833 A | 5/1996 | Ohashi et al. | 524/495 |
| 5,558,316 A | 9/1996 | Lee et al. | 267/140.12 |
| 5,599,868 A | 2/1997 | Bohm et al. | 524/495 |
| 5,639,817 A | 6/1997 | Probst et al. | 524/496 |
| 5,658,657 A | 8/1997 | Tomizawa et al. | 428/323 |
| 5,733,440 A | 3/1998 | Stangeland et al. | 208/148 |
| 5,914,364 A | 6/1999 | Cohen et al. | |
| 6,040,364 A | 3/2000 | Mabry et al. | |
| 6,043,302 A | 3/2000 | Spendlove | |
| 6,048,923 A | 4/2000 | Mabry et al. | |
| 6,075,084 A | 6/2000 | Mabry et al. | |
| 6,365,663 B2 | 4/2002 | Mabry et al. | |
| 6,372,822 B1 | 4/2002 | Chung et al. | |
| 6,413,478 B1 | 7/2002 | Mabry et al. | |
| 6,487,949 B1 * | 12/2002 | Dharia | 83/213 |
| 6,646,028 B2 | 11/2003 | Lopez-Serrano Ramos et al. | |
| 6,908,961 B2 | 6/2005 | Wang et al. | |
| 7,341,142 B2 * | 3/2008 | Wang et al. | 206/83.5 |
| 2002/0086917 A1 | 7/2002 | Chung et al. | |
| 2003/0195276 A1 | 10/2003 | Mabry et al. | |
| 2003/0203992 A1 | 10/2003 | Mabry et al. | |
| 2006/0100346 A1 | 5/2006 | Wang et al. | |

FOREIGN PATENT DOCUMENTS

| | | |
|---|---|---|
| DE | 1 620 918 | 3/1972 |
| EP | 0 051 450 B1 | 1/1986 |
| EP | 0 423 759 A2 | 4/1991 |
| EP | 0 278 743 B1 | 7/1991 |
| EP | 0 287 138 B1 | 8/1991 |
| EP | 0 287 392 B2 | 3/1994 |
| EP | 0 570 715 B1 | 6/1996 |
| EP | 0 763 558 A1 | 3/1997 |
| EP | 0 620 250 B1 | 5/1997 |
| GB | 705344 | 3/1954 |
| WO | WO 96/37547 | 11/1996 |
| WO | WO 97/36724 A2 | 10/1997 |
| WO | WO 97/36724 A3 | 10/1997 |
| WO | WO 99/16600 | 4/1999 |
| WO | WO03/042285 | 5/2003 |

OTHER PUBLICATIONS

International Preliminary Examination Report for PCT US02/35805, dated Oct. 27, 2005.

Functionalization of Elastomers by Reactive Mixing, The Malaysian Rubber Producers Research Association, RD 36223 (1994).

Wahab et al., "Natural Rubber Carbon Black Masterbatches from Field Latex," Proc. NR Technology Seminar, Rubber Research Institute of Malaysia, pp. 29-31 (1978).

Abstract of Japanese patent publication No. JP 52 62918, Oct. 1993 (Yokohama Rubber Co.).

Abstract of Japanese patent No. JP 57 53340, Mar. 1982 (Bridgestone Tire Co Ltd.).

"Continuous Mixers for the Polymer Industry", Farrel Corporation Bulletin No. 234-B (1993).

"CP Compact Processor", Farrel Corporation Bulletin (1998-2000).

* cited by examiner

_US 8,056,708 B2_

ELASTOMER COMPOSITE MATERIALS IN LOW DENSITY FORMS AND METHODS

This application claims the priority of and is a continuation application of U.S. patent application Ser. No. 10/039,774, filed Nov. 9, 2001 now U.S. Pat. No. 7,341,142, the entire contents of which are incorporated herein by reference.

FIELD OF THE INVENTION

The present invention is directed to methods for treating elastomer composites, and to low density forms of elastomer composites.

BACKGROUND

Various industries utilize elastomeric compounds including fillers, e.g., particulate fillers, dispersed in suitable elastomer, especially, for example, carbon black dispersed in natural rubber. There is a need for such elastomeric compounds to be easy to work with, such that a user can easily process the elastomeric compounds in production equipment used to make other end products, e.g., tires. Such production equipment includes, for example, Banbury mixers. Elastomeric compounds of high viscosity and high density are hard to work with, and, therefore, may not be suitable for use in equipment such as Banbury mixers, or other production equipment.

SUMMARY OF THE INVENTION

In accordance with a first aspect of the invention, there is provided a bale of elastomer composite comprising elastomer composite pieces, wherein the elastomer composite pieces comprise an elastomer and filler and wherein the bale has a void volume of at least 3%.

In accordance with another aspect of the invention, there is provided a method of producing a bale of elastomer composite comprising the steps of mixing an elastomer latex with a filler to form an elastomer composite, treating the elastomer composite to form elastomer composite pieces, and forming the elastomer composite pieces into a bale having a void volume of at least 3%. A preferred method of forming the elastomer composite pieces into a bale is by compression.

In accordance with another aspect of the invention, there is provided a method of producing an elastomer composite blend comprising the steps of blending a bale of elastomer composite pieces having a void volume of at least 3% with additional elastomer material comprising at least additional elastomer, to form an elastomer composite blend.

In accordance with another aspect of the invention, there is provided a container wherein at least a portion of the container is occupied by elastomer composite pieces comprising an elastomer and filler, and wherein the occupied portion of the container has a void volume of at least 3%.

In accordance with another aspect of the invention, there is provided a method of packaging elastomeric composite pieces in a container wherein at least a portion of the container is occupied by elastomer composite pieces comprising the steps of mixing an elastomer latex with filler to form an elastomer composite, treating the elastomer composite to form elastomer composite pieces, and packaging the elastomer composite pieces in a container such that the occupied portion of the container has a void volume of at least 3%.

In accordance with another aspect of the invention, there is provided a method of producing an elastomer composite blend comprising the steps of providing a container wherein at least a portion of the container is occupied by elastomer composite pieces and wherein the occupied portion of the container has a void volume of at least 3%, and blending the elastomer composite pieces with additional elastomer material comprising at least additional elastomer, to form an elastomer composite blend.

These and other aspects and advantages of various embodiments of the invention will be further understood in view of the following detailed discussion of certain preferred embodiments.

DETAILED DESCRIPTION OF CERTAIN PREFERRED EMBODIMENTS

The following is a detailed description of certain preferred embodiments of the present invention and is not intended to limit the present invention to the embodiments described below.

Novel and useful materials formed in accordance with certain preferred embodiments of the present invention include bales of elastomer composite pieces formed of elastomer and filler and having a void volume of at least 3%, and elastomer composite pieces within a container where a unit volume of the elastomer composite pieces has a void volume of at least 3%. Such materials advantageously are easy to work with such that a user can process such materials in production equipment used to make other intermediate or end products. Suitable techniques for preparing such materials are discussed in greater detail below.

In accordance with certain preferred embodiments, elastomer latex and filler may be mixed and coagulated to form elastomeric composites, described in greater detail below. Optionally, the elastomer composite may undergo intermediate processing steps, including, for example, processing in a mixer or compounder, such as a continuous mixer or compounder, to provide elastomer composite having reduced Mooney viscosity, and improved control of molecular weight, bound rubber and water content. Such processed elastomer composite is also referred to herein as compounded elastomer composite. The elastomer composite is treated to form elastomer composite pieces. Such elastomer composite pieces are baled or containerized such that the void volume of the bale or the portion of the container occupied by the elastomer composite pieces is at least 3%. It should be understood that the term "bale of elastomer composite," unless otherwise clear from context, refers to a bale formed of elastomer composite pieces as described above.

As noted above, the novel materials of the invention can be prepared by incorporating methods of producing elastomer composite formed of elastomer and filler, such as mixing and coagulating. Preferred methods and apparatus for producing the elastomer composites are described in the commonly assigned U.S. Pat. Nos. 6,075,084, 6,048,923, and 6,040,364, and commonly assigned U.S. patent application Ser. No. 09/549,051, the entire disclosure of each of which is hereby incorporated herein by reference for all purposes. U.S. Pat. Nos. 6,040,364 and 6,048,923 describe methods for producing elastomer composites, referred to here in some instances as wet impact coagulation, comprising feeding a continuous flow of first fluid comprising elastomer latex to a mixing zone of a coagulum reactor defining an elongate coagulum zone extending from the mixing zone to a discharge end, and feeding a continuous flow of second fluid comprising a filler, e.g., a particulate filler, under pressure to the mixing zone of the coagulum reactor to form a mixture with the elastomer latex. The mixture passes as a continuous flow to the discharge end of the coagulum reactor, and the particulate filler is effective to coagulate the elastomer latex. More specifically, the second fluid is fed against the first fluid within the mixing zone sufficiently energetically to substantially completely coagulate the elastomer latex with the particulate filler prior to the discharge end of the coagulum reactor. A substantially continuous flow of elastomer composite is discharged from the discharge end. As noted above, these processes are referred to below in some instances as wet impact coagulation.

In certain preferred embodiments, particulate filler slurry is fed to the mixing zone preferably as a continuous, high velocity jet of injected fluid, while the latex fluid typically is fed at relatively lower velocity. The high velocity, flow rate and particulate concentration of the filler slurry are sufficient to cause mixture and high shear of the latex fluid, flow turbulence of the mixture within at least an upstream portion of the coagulum zone, and substantially complete coagulation of the elastomer latex prior to the discharge end. Substantially complete coagulation can thus be achieved, in accordance with preferred embodiments, without the need of employing an acid or salt coagulation agent. Preferred continuous flow methods for producing the elastomer composites comprise continuous and simultaneous feeding of latex fluid and filler slurry to the mixing zone of the coagulum reactor, establishing a continuous, semi-confined flow of a mixture of the latex and filler slurry in the coagulum zone. Elastomer composite crumb in the form of "worms" or globules are discharged from the discharge end of the coagulum reactor as a substantially constant flow concurrently with the on-going feeding of the latex and carbon black slurry streams into the mixing zone of the coagulum reactor.

In the described methods employing wet impact coagulation, feed rates of latex fluid and particulate filler fluid to the mixing zone of the coagulum reactor can be precisely metered to achieve high yield rates, with little free latex and little undispersed filler in the product crumb at the discharge end of the coagulum reactor. Extremely high feed velocity of the particulate filler fluid into the mixing zone of the coagulum reactor and velocity differential relative to the latex fluid feed are believed to be significant in achieving sufficient turbulence, i.e., sufficiently energetic shear of the latex by the impact of the particulate filler fluid jet, for thorough mixing and dispersion of the particulate into the latex fluid and coagulation. Prior techniques involving premixing of latex and particulate filler, such as in the above-mentioned Heller et al patent and Hagopian et al patent, do not recognize the possibility of achieving coagulation without exposing the latex/particulate mixture to the usual coagulant solution with its attendant cost and waste disposal disadvantages.

High mixing energies yield elastomer composite crumb with excellent dispersion. The particulate filler fluid and elastomer latex are fed preferably continuously and simultaneously, meaning that an ongoing flow of coagulated masterbatch is established from the mixing zone to the discharge end of the coagulum reactor while an uninterrupted flow of the feed fluids is maintained. Modified and alternative suitable methods for producing the elastomer composites disclosed herein will be apparent to those skilled in the art, given the benefit of this disclosure.

As noted above, the elastomer composite may optionally be further processed to produce elastomer composite having reduced Mooney viscosity and improved control of molecular weight, bound rubber and water content. Suitable equipment for such further processing includes, for example, a mixer or compounder, such as a continuous mixer or compounder. Suitable continuous mixers or compounders are well known and commercially available, including, for example, the Unimix Continuous Mixer from Farrel Corporation of Ansonia, Conn. U.S. patent application Ser. No 09/549,051 describes further processing of elastomer composites through the use of a continuous mixer or compounder.

Whether or not the elastomer composite is processed by a mixer or compounder, the elastomer composite is further treated to form elastomer composite pieces. In certain preferred embodiments, the elastomer composite is fed to an open mill, or roll mill as, for example, a length of extrudate exiting a continuous mixer or compounder, and may be cut into smaller lengths prior to entering the open mill. The elastomer composite may optionally be fed to the open mill via a conveyor such as a conveyor belt, conduit, pipe, or other suitable means for transporting the elastomer composite from, for example, a continuous mixer or compounder to the open mill. The open mill typically comprises a pair of rollers that further control the Mooney viscosity of the elastomer composite. The rollers may optionally be heated or cooled to provide enhanced operation of the open mill. In certain embodiments, the open mill may reduce the temperature of the elastomer composite to approximately 100° C.

After exiting the open mill, the elastomer composite optionally may be fed by a conveyor to a cooling system that may include a cooling water spray, with its water being fed from a cooling water tank or other water source. The water from the cooling water spray may be sprayed directly onto the elastomer composite. If cooling water spray has been used, optionally an air knife or other high pressure air blower or other suitable means can be used to remove any cooling water that did not evaporate from the elastomer composite.

In certain preferred embodiments, the composite pieces may have a substantially planar form. Suitable planar composite pieces may be formed from sheets that are cut into smaller strips or pieces. Planar, as used herein, refers to materials that preferably have a width and/or length which is greater than the thickness of the material. It is to be appreciated that the surface of the composite pieces may not be entirely smooth, and may contain irregularities, and that the term planar refers to the overall dimensions of the composite pieces.

In certain preferred embodiments, pieces of elastomer composite may be formed by using a granulator, which cuts the elastomer composite into short strips that are more easily handled by traditional rubber industry processes and equipment. In certain preferred embodiments, the elastomer composite exiting the open mill in sheet form may be cut longitudinally into long strips, which are fed into the granulator. The granulator may then cut the long strips transversely into smaller strips. The strips produced by a granulator may, therefore, constitute the end product, and be used directly in industry processes and equipment. In certain preferred embodiments, the strips formed by a granulator have a length of approximately 40 mm to 60 mm, a width of approximately 5 mm to 10 mm, and a thickness of approximately 5 mm to 10 mm. Suitable granulators will become readily apparent to those skilled in the art, given the benefit of this disclosure.

In certain preferred embodiments, the granulator may be, for example, a pelletizer. A pelletizer will convert the elastomer composite into small pellets that can also be easily handled by typical industry processing equipment. For example, the pelletizer may extrude the elastomer composite through a die and cut it into small cylindrical pellets. In certain preferred embodiments, the pellets have a diameter of approximately 5 mm to 10 mm and a length of approximately 10 mm to 30 mm. The elastomer composite pieces may be formed of other shapes as well, depending on the shape of the die and the method of granulating. Another exemplary pelletizer would consist of a spinning blade within a container that cuts the elastomer composite into small pellets. Suitable pelletizers will become readily apparent to those skilled in the art, given the benefit of this disclosure.

Preferably, composite elastomer pieces prepared in accordance with the present invention will have a size suitable for further processing in certain production environments. Other devices for converting the elastomer composite into composite pieces suitable for further processing will become readily apparent to those skilled in the art, given the benefit of this disclosure.

The elastomer composite pieces can then optionally be fed, e.g. by conveyor, to a baler, where the elastomer composite, preferably under compression, can be baled more or less tightly or densely by varying the dwell time, that is, the pressure and time in the baler, depending on its intended use. The term "bale", as used herein, refers to material that is form-retaining in the free state. Optionally, the bale may be bound or wrapped. In certain production environments, baled elastomer composite may be of a density, hardness, and/or Mooney viscosity higher than desirable for processing. For example, in the production of tires or other products, certain process equipment, e.g., Banbury mixers and the like, cannot readily process the baled product due to high density, hardness and/or Mooney viscosity. Additional processing is often required in order to make the elastomer composite suitable for processing. Such additional processing may include additional mastication of the elastomer composite, and, therefore, potential over-mastication of the composite, which may adversely affect desired characteristics and operating parameters of the elastomer composite.

In order to allow the industry equipment to process the bales, the bales of the present invention are preferably formed as loose bales, that is, having a higher void volume. A suitable loose bale preferably has a void volume of at least 3%, and, more preferably, between approximately 3% to 40%, and, most preferably between approximately 5% and 20%. Suitable baling equipment will be apparent to those skilled in the art, given the benefit of this disclosure.

The phrase "void volume", as used herein, refers to the percent volume of voids, that is, air gaps, spaces, or interstices, in a bale or occupied portion of a container of elastomer composite pieces. In the case where the elastomer composite pieces are baled, the void volume can be determined by subtracting the volume of the elastomer composite pieces (which can be calculated from the total weight of the pieces and the material density, as weight per unit volume) from the total volume of the bale. The result is then divided by the total volume of the bale and multiplied by 100 to get the percentage. Thus, for a bale, the void volume is the volume of the voids in the bale, divided by the volume of the bale, multiplied by 100. Since the void volume of the elastomer composite pieces in a bale is considered to include the volume between pieces, or inter-pieces, it would include the volume of irregularities found on the surfaces of the elastomer composite. However, the void volume would not be considered to include voids found within the elastomer composite pieces themselves, that is, it would not include intra-piece voids (such as bubbles within the pieces).

The higher void volume a particular bale has, the easier it will be for process equipment to handle the elastomer composite. Consequently, even for elastomer composite having a relatively high Mooney viscosity and/or density, a loosely packed bale with a substantial or high void volume may easily be processed by production equipment, such as a Banbury mixer or the like. In mixing equipment such as a Banbury mixer, processing of elastomer composite material that does not have the void volume of the present invention leads to a very high initial torque, resulting in processing problems and possible equipment failure. Through the use of elastomer composite material processed in accordance with the present invention and having a desired void volume, the initial torque required to operate a mixer such as a Banbury mixer is significantly reduced, leading to improved processing of the elastomer composite and, therefore, reduced equipment problems and failures. This can result in significant energy savings and cost benefits.

To produce a bale of elastomer composite pieces of a desired void volume, the pressure, temperature and time in the baler can be varied. The pressure and temperature are adjusted such that the value of each is sufficient to achieve a desired void volume for a bale. It is generally the rule that temperature and pressure will vary inversely with one another. Suitable pressures, temperatures and times will become readily apparent to those skilled in the art, given the benefit of this disclosure.

In other preferred embodiments, the elastomer composite pieces travel via a conveyor directly to a container and are not baled. The container may be, for example, a bag, a drum, a box, or any other container suitable for carrying elastomer composite pieces. The pieces of elastomer composite are packaged in the container such that the occupied portion of the container—that is, the portion of the container filled with elastomer composite pieces—has a void volume of at least 3%, more preferably, between approximately 3% and 40%, and, most preferably between approximately 5% and 30%. The void volume of the container of elastomer composite pieces can be determined in a manner similar to that described above for a bale. However, only that portion of the container that is occupied by the elastomer composite pieces is considered in determining the void volume. Thus, if the container is, for example, only half filled, the head-space above the filled region is not considered. The void volume is therefore determined by subtracting the volume of the elastomer composite pieces from the total volume of the container occupied by composite pieces, dividing the result by that occupied volume, and multiplying by 100. Again, when measuring the void volume of the container, any air space above the upper level of the elastomer composite pieces within the container is not to be considered when calculating the void volume of the container of elastomer composite pieces.

The size, shape, and distribution of the voids may vary within the bale or occupied portion of the container. Preferably the voids are substantially evenly distributed throughout the bale or occupied portion of the container.

The elastomer composite may optionally be treated with an anti-tack material such as, for example, an aqueous solution of zinc stearate, an aqueous silicate solution, or other suitable anti-tack materials which will become readily apparent to those skilled in the art, given the benefit of this disclosure. The anti-tack material may be applied to the elastomer composite in a dip tank, sprayed on, or applied in any other suitable fashion. Appropriate equipment for the application of anti-tack material to the elastomer composite will become readily apparent to those skilled in the art, given the benefit of this disclosure. It is to be appreciated that the anti-tack material may be applied to the elastomer composite at numerous points during its processing, including, for example, when it is in sheet form prior to it being slit and cut into composite pieces, just after it is slit into strips, or when in it is in its final form as composite pieces.

Elastomer composite in accordance with preferred embodiments of the present invention preferably has a Mooney viscosity in its baled or containerized form of at least 100 and more preferably approximately 100-120. It has been found that a bale or container of elastomer composite pieces having a void volume of at least 3% enables an elastomer composite with a high Mooney viscosity to be more suitable for processing. This represents a substantial improvement in the art, since materials which were thought to be difficult to process are now, through this disclosure, able to be processed.

In certain preferred embodiments, the elastomer composite may flow from a continuous compounder through an open mill, a cooling system and a granulator to form a final elastomer composite product in composite piece form that is packaged in a container having a void volume suitable for further processing. Optionally, the composite pieces may then be further processed by a baler to form loose bales having a void volume suitable for further processing. As noted above, in either of these two embodiments, the granulator may be a pelletizer, or other suitable device, for converting the elastomer composite into composite pieces suitable for further processing.

The open mill can be expensive to operate due to high energy consumption and its labor intensive operation. Thus, in other preferred embodiments, the elastomer composite may flow from the continuous compounder directly to a granulator to form a final elastomer composite product in composite piece form. Optionally, the composite pieces may then be further processed by a baler to form loose bales having a void volume suitable for processing by additional process equipment. In either of these two embodiments, the granulator may be a pelletizer, or other suitable device, for converting the elastomer composite into composite pieces suitable for further processing.

It is to be appreciated that a cooling system may optionally be placed downstream of the granulator or pelletizer, or omitted entirely from the process.

In certain preferred embodiments, an elastomer composite blend can be formed in a mixing device, such as a Banbury mixer or the like. A bale of elastomer composite formed in a baler, or elastomer composite pieces themselves, are placed in a mixing device. Additional elastomer material from a reservoir or other source is added to the mixing device. The addition of elastomers can produce elastomer blends via the mixing device. Exemplary elastomers include, but are not limited to, rubbers, polymers (e.g., homopolymers, copolymers and/or terpolymers) of 1,3-butadiene, styrene, isoprene, isobutylene, 2,3-dimethyl-1,3-butadiene, acrylonitrile, ethylene, and propylene and the like.

Additives may also be introduced into the mixing device. Exemplary additives include, for example, filler (which may be the same as, or different from, the filler used in the coagulum reactor; exemplary fillers including silica and zinc oxide, with zinc oxide also acting as a curing agent), other elastomers, other or additional composite, antioxidants, antiozonants, plasticizers, processing aids (e.g., stearic acid, which can also be used as a curing agent, liquid polymers, oils, waxes, and the like), resins, flame-retardants, extender oils, lubricants, cure activators (e.g., zinc oxide or stearic acid) and a mixture of any of them. It is to be appreciated that any combination of elastomers, additives and second composite may be added in the mixing device to the bale or pieces of elastomer composite.

In view of the foregoing disclosure, it will be apparent to those skilled in the art that various additions, modifications, etc. can be made without departing from the true scope and spirit of the invention. All such additions and modifications are intended to be covered by the following claims.

What is claimed is:

1. A bale of elastomer composite comprising elastomer composite pieces, wherein the elastomer composite pieces comprise an elastomer and filler, wherein the bale has a void volume of 3% to 20%, the elastomer composite pieces produced by a method comprising:
   mixing an elastomer latex with a filler slurry to form an elastomer composite; and
   treating the elastomer composite to form elastomer composite pieces in substantially planar form.

2. A bale of elastomer composite comprising elastomer composite pieces, wherein the elastomer composite pieces comprise an elastomer and filler, wherein the bale has a void volume of 3% to 20%, the elastomer composite pieces produced by a method comprising:
   mixing an elastomer latex with a filler slurry to form an elastomer composite; and
   treating the elastomer composite to form elastomer composite pieces in the form of short strips.

3. The bale of claim 2, wherein the short strips are approximately 40 mm to 60 mm long.

4. The bale of claim 3, wherein the short strips are approximately 5 mm to 10 mm thick.

5. A bale of elastomer composite comprising elastomer composite pieces in substantially planar form, wherein the elastomer composite pieces comprise an elastomer and filler, wherein the bale has a void volume of 3% to 20%.

6. A bale of elastomer composite comprising elastomer composite pieces in the form of short strips, wherein the elastomer composite pieces comprise an elastomer and filler, wherein the bale has a void volume of 3% to 20%.

7. The bale of claim 6, wherein the short strips are approximately 40 mm to 60 mm long.

8. The bale of claim 6, wherein the short strips are approximately 5 mm to 10 mm thick.

* * * * *